United States Patent Office 3,783,011
Patented Jan. 1, 1974

---

3,783,011
PROTECTING PLASTICS FROM PHOTO-DEGRADATION
Jean Chauffoureaux, Brussels, Belgium, assignor to Solvay & Cie, Brussels, Belgium
No Drawing. Filed Dec. 27, 1971, Ser. No. 212,671
Claims priority, application France, Jan. 6, 1971, 7100274
Int. Cl. B01j 1/10
U.S. Cl. 117—106 R  9 Claims

ABSTRACT OF THE DISCLOSURE

Protection from photodegradation by solar radiation is imparted to plastics normally subjected to such photodegradation by exposing the plastics to an atmosphere of anti-UV agent in vapor state prior to exposure to solar radiation.

BACKGROUND OF THE INVENTION

Plastics undergo a photochemical reaction which results in degradation. The most common evidences of photochemical breakdown in plastics are discoloration and changes in physical properties. Elongation is lost and tensile strength decreases; the plastic becomes brittle rather than remaining flexible.

Sunlight has energy in the ultraviolet. Ultraviolet (UV) wavelengths are high in energy. When the wavelength is e.g., less than about 3400 A., the energy is capable of breaking many chemical bonds. Short wavelengths of solar radiation give rise to a more or less rapid photodegradation of plastics, such as vinyl chloride homopolymers and copolymers, acrylonitrile-butadiene-styrene copolymers, polyolefins, polycarbonates, polystyrene, etc., in outdoor use. This photodegradation induces a rapid decay of mechanical properties, especially impact resistance, and sometimes decoloration and opacification of exposed articles. Actual exposures show that very few plastics can be used outdoors without degrading, particularly if they are translucent or transparent. Polyester sheeting yellows; polyethylene and polypropylene become brittle; rigid vinyl chloride turns brown or black; and flexible polyvinyl chloride begins to spot and loses flexibility. The art-skilled know which plastic materials degrade on exposure to sunlight.

To counteract or eliminate ultraviolet degradation of plastics, anti-UV agents have been incorporated in resin during processing in the preparation of finished plastics or plastic articles. Such treatment has been improved by incorporating anti-oxidants and products which inhibit free-radical formation in the (plastic) mass.

Since solar radiation-promoting penetration in plastics is very weak (surface layers of an exposed article absorb much of the harmful radiation) and anti-UV agents are relatively costly, attempts have been made to devise processes which provide a concentration of anti-UV agent in or on surface layers of articles to be preserved rather than a relatively useless dispersion of such agent into the mass. Although a coating containing a UV-absorbing material would appear to be a logical solution to the problem, no one has previously been able to develop a coating that contains sufficient absorber, that bonds well to plastics in all of its shapes and forms, and is also economical to apply and commercially feasible.

For protection against UV degradation, plastic articles have been coated with varnish containing an anti-UV agent. Unfortunately, different varnishes are required for different types of plastics, and adhesion presents a complicating factor. Moreover, with the lapse of time, varnish tends to strip off from a plastic substrate coated therewith.

Anti-UV agent has been applied to the surface of a plastic substrate by dipping or coating from a solution of the agent in a solvent which has a swelling action on the resin from which the substrate is prepared. Relatively expensive and cumbersome equipment is required for solvent recovery. Solvent penetrates the surface layer of the article during and subsequent to the treatment. Residual traces of the solvent promote surface effluorescence. Complete extraction of the solvent is difficult. Moreover, in view of its swelling action, the solvent, which must be discerningly selected in accordance with each resin treated, influences the mechanical properties of the thus protected articles. The coating technique only allows protection of continuous profiles and practically plane surfaces, whereas dipping generates formation of castings and blooms of solvent, which degrade the surface finish of the treated articles.

Thermal diffusion of anti-UV agent in liquid form directly in the surface layer of the article to be protected has also been proposed. The anti-UV agent coats the article (to be protected), which is heated in order to induce melting of the anti-UV agent and diffusion thereof into the surface layer of the aforesaid article. The required thermal treatment (for obtaining diffusion of the anti-UV agent into the material) sometimes degrades the resin of the treated article. Moreover, this treatment is relatively slow and modifies the surface finish of the treated article. Examination of the surface of articles treated in this way reveals the presence of small superficial cracks, which increase the fragility of the treated articles. Besides, this process is not suitable for treatment of articles with relatively elaborate outlines. Solutions or dispersions of anti-UV agent are required to obtain a regular and a relatively thin coating; but, in that case, the drawbacks are the same as in the hereinabove described process.

SUMMARY OF THE INVENTION

Disadvantages of prior processes are avoided in protecting plastic surfaces against photodegradation by solar radiation by a method which is readily applicable to finished or semi-finished articles, irrespective of their shape, and wherein no solvent is employed. The method does not require thermal treatment which could deform a treated article or deteriorate constituent material; it does not affect mechanical properties of treated articles, but it does make possible the application of a protective (anti-UV agent) impregnation in a relatively short period of time. More efficient protection of a plastic substrate against UV degradation is now afforded for a given weight of anti-UV agent because of the optimum anti-UV agent distribution in the surface layer of the substrate achieved by this method.

The surface of a plastic article (to be protected against photodegradation by solar radiation) is subjected to the action of an atmosphere containing an anti-UV agent in vapor state.

DETAILS

An atmosphere containing anti-UV agent in vapor state is, e.g., obtained by introducing into a treatment enclosure vapor liberated by a liquid bath of anti-UV agent heated at a temperature varying between 100° and 260° C., according to the nature of the anti-UV agent used. A balance between liquid and vapor phases of the anti-UV agent is readily maintained according to one embodiment. This makes it possible to operate within an enclosure saturated with vapor of an anti-UV agent.

The concentration of anti-UV agent applied in the material (plastic) surface layer is a direct function of the vapor pressure of the anti-UV agent in the treatment enclosure. When the vapor pressure of the anti-UV agent at the treatment temperature is too weak to give the desired impregnation of the superficial layer of the article to be protected with an anti-UV agent in a period of time compatible with industrial feasibility, forced circulation of vapor liberated by the liquid bath to the treatment enclosure may be induced and treatment effected in an atmosphere super-saturated with vapor of anti-UV agent.

The articles to be treated against photodegradation are continuously or discontinuously introduced into and taken out of the treatment enclosure in accordance with their form or dimensions, means being provided to avoid or at least to reduce to a minimum the efflux of anti-UV agent vapor from the treatment enclosure.

The treatment time to provide an anti-UV agent impregnation is reduced as the temperature of the article to be treated is increased. It is thus desirable to preheat the articles to be treated without exceeding a temperature above which their shape or their mechanical properties may be modified.

The depth of anti-UV agent penetration into the article to be protected exceeds that desired when the preheating temperature of the article is higher than the temperature of the treatment enclosure. Preheating articles to be treated at a temperature between about 50° and 120° C. is generally preferred.

Tests on articles treated according to the invention reveal that the anti-UV agent impregnation is uniformly distributed inside the surface layer, and that the agent is concentrated in a surface layer of material, the thickness of which may be varied from some microns to several tens of microns with a small variation of the concentration in anti-UV agent along the thickness of the layer.

The process of the invention is suitable for articles made of virtually any resin subject to photodegradation by solar or other UV radiation. This includes many resins, such as the vinyl chloride homopolymers and copolymers, acrylonitrile-butadiene and/or styrene copolymers, polystyrene, polycarbonates, polyolefins, etc.; this list is only given by way of example and is not limitative.

Anti-UV agents are known. In fact there are already a number of recognized chemical classes of compounds which are good UV absorbers. The first such class that was appropriate for the protection of plastics consisted of ortho - hydroxybenzophenones. Subsequently discovered good UV absorbers include benzotriazoles, substituted acrylonitriles and a number of nickel complexes of phenols. The benzophenones and benzotriazoles are strong UV absorbers. The acrylonitrile derivatives and the nickel complexes appear to function in a somewhat different fashion; although they do not absorb UV light strongly, they are able to provide light stabilization by some other chemical mechanism. Irrespective of the mechanism, all anti-UV agents are useful for the subject invention as long as a sufficient concentration of their vapor can be maintained (at a temperature which is not detrimental to the substrate) in an atmosphere (without degradation of the anti-UV agent) to build up a suitable impregnation of the superficial layer of an article to be protected.

Anti-UV agents can be used singly or in combination with other such agents of the same or different classes. The benzophenone and benzotriazole derivatives are the best known anti-UV agents, and these are preferred.

The thickness of a layer of anti-UV agent impregnating the article may be from as small as about 3 microns ($\mu$) to about 75$\mu$. The upper limit is not critical, but more anti-UV agent than necessary is not ordinarily employed. Likewise, the concentration of anti-UV agent in the layer may vary from about 1 to about 10 grams per square meter of surface area. The precise thickness of the layer or concentration of the anti-UV agent depends on both the particular anti-UV agent employed and the precise nature of the plastic substrate being protected. With regard to the plastic substrate, the chemical constitution of the resin or polymer is of the essence. For any plastic and any anti-UV agent, the required layer thickness and agent concentration are readily determined.

The exposure time of the plastic substrate to the anti-UV agent vapor may vary over a large range. The time, per se, is not critical. From a practical standpoint it will normally be maintained at a relatively short period, e.g., from about 0.5 to about 10 or 15 minutes. This time is dependent upon the selected anti-UV agent and the temperature of the vapor to which the plastic is exposed as well as the temperature of the plastic itself. Suitable exposure times are readily determined for any particular set of parameters.

The process according to the invention is illustrated by the following examples. They are given by way of illustration only and in no way restrict the invention.

Example 1

Polyvinyl chloride sheets are subjected for 4 minutes to the action of an atmosphere saturated with 2-hydroxy-4-methoxybenzophenone vapor, such sheets having been preheated to 66° C.

The saturated atmosphere is obtained by introducing the vapor into a closed treatment enclosure (maintained by thermostat control at 66° C.). The vapor is liberated from a liquid bath of anti-UV agent heated at 205° C.

After the noted lapse of time, the sheets are impregnated with 3.1 g. of anti-UV agent per square meter, this impregnation being stable and uniformly distributed over the sheet area and in a surface layer, the thickness of which is from about 6 to about 8 microns.

The so-treated sheets possess excellent resistance to photo-degradation when they are used outdoors for a long period of time.

In order to show the influence of this treatment on mechanical properties of treated sheets, tests of impact tensile strength have been carried out according to DIN 53448 standard (unnicked test piece), the shock-traction being applied at a speed of 3.83 m./sec. on sheet samples cut prior to and after treatment. The impact tensile strength is equal to 685 kg. cm./cm.$^2$ for untreated sheets and to 672 kg. cm./cm.$^2$ for treated sheets. Thus, the anti-UV treatment according to the invention does not modify the mechanical properties of the treated articles, which is not the case when a treatment requiring the use of solvents is employed.

Example 2

Opaque grey polyvinyl chloride sheets are treated as in Example 1.

The various test parameters are the following:

Temperature of the bath of 2-hydroxy-4-methoxy-
benzophenone _____° C__ 202
Temperature of the closed treatment
enclosure _____° C__ 65
Temperature of the sheet preheating _____° C__ 65
Treatment time _____min__ 8

After this lapse of time, the sheets are impregnated with 7.6 g. of anti-UV agent per square meter, this impregnation being stable and uniformly distributed over the sheet area and in a surface layer having a thickness of 18 microns.

The so obtained sheets present excellent resistance to photo-degradation by solar radiation.

Example 3

Polyvinyl chloride sheets are treated as indicated in Example 1, 2-hydroxy-4-octoxybenzophenone being the anti-UV agent used.

The sheets are introduced into the treatment enclosure at room temperature. Various other test parameters are:

Temperature of the bath of 2-hydroxy-4-octoxy-
benzophenone _____° C__ 217
Temperature of the closed treatment
enclosure _____° C__ 110
Treatment time _____min__ 8

After the noted treatment time, the sheets are impregnated with 4 g. of anti-UV agent per square meter, this impregnation being stable and uniformly distributed on the sheet area and in a surface layer 30 microns thick.

Example 4

Opaque and white polystyrene sheets are treated as in Example 1, 2 - hydroxy-4-methoxybenzophenone being used as anti-UV agent.

The polystyrene sheets are not preheated, and the test parameters follow:

Temperature of the bath of 2-hydroxy-4-methoxy-
benzophenone _____ °C__ 203
Temperature of the closed treatment enclosure °C__ 104
Treatment time _____ sec__ 60

After the noted time, the sheets are impregnated with 3.2 g. of anti-UV agent per square meter, this impregnation being stable and uniformly distributed over the sheet area in a surface layer 50 microns thick. The so treated polystyrene sheets resist photodegradation very well.

Example 5

Translucid polycarbonate sheets treated as in Example 1, 2-hydroxy-4-methoxybenzophenone being the anti-UV agent used.

The test parameters are the following:

Temperature of the bath of 2-hydroxy-4-methoxy-
benzophenone _____ °C__ 200
Temperature of the closed treatment enclosure °C__ 102
Temperature of sheet preheating _____ °C__ 97
Treatment time _____ min__ 2

After this lapse of time, the sheets are impregnated with 4.6 g. of anti-UV agent per square meter, this impregnation being stable and uniformly distributed over the sheet area in a surface layer 12 microns thick. The so-treated polycarbonate sheets resist photodegradation very well.

Example 6

ABS plates are treated as in Example 1, 2-hydroxy-4-methoxybenzophenone being the anti-UV agent used. The test parameters are the following:

Temperature of the bath of 2-hydroxy-4-methoxy-
benzophenone _____ °C__ 205
Temperature of the closed treatment enclosure °C__ 103
Temperature of plate preheating _____ °C__ 85
Treatment time _____ sec__ 60

After the noted period of time, the ABS plates are impregnated with 1.7 g. of anti-UV agent per square meter, this impregnation being stable and uniformly distributed over the plate area in a surface layer 12 microns thick. These plates resist photodegradation significantly better than corresponding untreated plates.

Example 7

Polypropylene plates are treated as indicated in Example 1, the anti-UV agent being a benzotriazole derivative marketed under the trade name Tinuvin P by Geigy.

The test parameters are the following:

Temperature of the bath of Tinuvin P _____ °C__ 180
Temperature of the closed treatment enclosure °C__ 92
Temperature of plate preheating _____ °C__ 92
Treatment time _____ min__ 8

After this time, the plates are impregnated with 3.7 g. of Tinuvin P per square meter of surface, this impregnation being stable and uniformly distributed over the plate area in a surface layer 10 microns thick. The so-treated polypropylene plates resist photodegradation very well.

It will be understood that the above description of the present invention is susceptible to various modifications, changes and adaptations, and the same are intended to be comprehended within the meaning and range of equivalents of the appended claims.

I claim:

1. A process for imparting protection against photodegradation by solar radiation to plastic subject to ultraviolet photodegradation which comprises exposing the plastic in solid form to an atmosphere containing an organic anti-UV agent in vapor state for a time sufficient to form an ultraviolet photodegradation protection impregnation in the surface of the plastic.

2. A process according to claim 1 wherein the plastic in solid form is at a temperature of from 50° to 120° C. when exposed to the atmosphere containing anti-UV agent vapor.

3. A process according to claim 1 which comprises heating a liquid bath of the anti-UV agent at a temperature within a range of from 100° to 260° C. and passing anti-UV agent vapor liberated from the bath into an enclosure wherein the plastic in solid form is exposed to the atmosphere containing anti-UV agent in vapor state.

4. A process according to claim 3 wherein the atmosphere in the enclosure is saturated with anti-UV agent vapor.

5. A process according to claim 3 wherein the atmosphere in the enclosure is supersaturated with anti-UV agent vapor.

6. A process according to claim 3 wherein the temperature of the enclosure is controlled at a temperature lower than that of the liquid bath.

7. A process according to claim 1 wherein the anti-UV agent is a member selected from the group consisting of a benzophenone and a benzotriazole.

8. A process according to claim 1 wherein the temperature of the plastic in solid form is less than that of the anti-UV agent vapor atmosphere to which said plastic is exposed.

9. A process according to claim 1 wherein the plastic subjects are realized in a plastic material selected in the group formed by polyvinyl chloride, vinyl chloride copolymers, acrylonitrile-butadiene-styrene copolymers, polyolefins, polycarbonates and polystyrene.

References Cited

UNITED STATES PATENTS

| | | | |
|---|---|---|---|
| 2,964,427 | 12/1960 | Rheinberger et al. | 117—106 |
| 3,519,462 | 7/1970 | Bristol et al. | 117—33.3 |

ALFRED L. LEAVITT, Primary Examiner

J. MASSIE, Assistant Examiner

U.S. Cl. X.R.

117—33.3, 138.8 B